United States Patent [19]
Lin

[11] Patent Number: 5,254,933
[45] Date of Patent: Oct. 19, 1993

[54] BATTERY CHARGING DEVICE

[76] Inventor: Pi-Chu Lin, No. 157-8, Hu-Tzu Nei, Hu-Nei Li, Chia-Yi Hsien, Taiwan

[21] Appl. No.: 911,191

[22] Filed: Jul. 9, 1992

[51] Int. Cl.⁵ .............................................. H02J 7/10
[52] U.S. Cl. ........................................................ 320/35
[58] Field of Search .............................. 320/35, 36, 48

[56] References Cited

U.S. PATENT DOCUMENTS

| | | | |
|---|---|---|---|
| 3,911,350 | 10/1975 | Swope | 320/35 X |
| 3,911,351 | 10/1975 | Saslow | 320/35 X |
| 4,297,630 | 10/1981 | Mullersman | 320/35 |
| 4,544,846 | 10/1985 | Bailey et al. | 320/35 X |
| 4,998,056 | 3/1991 | Cole | 320/35 |

*Primary Examiner*—R. J. Hickey
*Attorney, Agent, or Firm*—Dinnin & Dunn

[57] ABSTRACT

A battery charging device includes a step-down unit which receives an external alternating current line voltage input and which reduces the line voltage input to an appropriate level. A rectifier unit receives the reduced line voltage input from the step-down unit and generates a direct current signal to charge a rechargeable battery unit which is serially connected to the rectifier unit via a current limiting resistor. A control unit has a temperature switch and a high resistance heating unit which is connected across the temperature switch. The switch and the heating unit are provided in a single circuit package. The switch is serially connected to the battery unit and is closed when the temperature of the battery unit is below a predetermined limit. The switch is opened so as to permit the direct current signal to flow through the heating unit when the temperature of the battery unit reaches the predetermined limit. The heating unit reduces the value of the direct current signal and generates heat which is sufficient to maintain the switch in an open circuit state when the direct current signal flows therethrough.

2 Claims, 2 Drawing Sheets

BATTERY CHARGING DEVICE

BACKGROUND OF THE INVENTION

1. Field of the Invention

The invention relates to a battery charging device, more particularly to a battery charging device with fast and slow charging capabilities.

2. Description of the Related Art

Portable electrical devices usually require a battery source so as to operate the same. Rechargeable battery units are preferably used in order to reduce the costs incurred by the consumer. Different types of battery charging devices are presently available to charge the battery units.

In order to reduce the charging time while avoiding damage to the battery units, the battery charging device initially operates in a fast charging state until the battery voltage reaches a predetermined value. The battery charging device then automatically switches to a slow charging state in which current flow to the battery unit is minimized so as to prevent damage to the battery units.

FIG. 1 is a schematic electrical circuit diagram of a conventional battery charging device which can automatically switch from a fast charging state to a slow charging state. A transformer (T) receives an external alternating current (AC) line voltage input and reduces the line voltage input to a more appropriate level. The output of the transformer (T) is received by a bridge rectifier unit which comprises four diodes (D1-D4) and which generates a direct current signal to charge a battery unit (B). The following is a brief description of the operation of the conventional battery charging device:

When the battery charging device is operating in the fast charging state, the direct current signal from the rectifier circuit initially flows through the battery unit (B), a diode (D5) and a resistor (RI), thus charging a capacitor (CI). A zener diode (DZ) is reverse biased and has a voltage which is sufficient to trigger a thyristor (SCR) to conduct. Conduction of the thyristor (SCR) causes a large portion of the direct current signal to flow through the battery unit (B), a temperature switch (T.S.), a current limiting resistor (R3) and the thyristor (SCR). The temperature switch (T.S.) is in contact with the battery unit (B) and monitors the temperature of the battery unit (B). Since the temperature of the battery unit (B) gradually increases when fast charging is being conducted, the switch (T.S.) eventually opens when the temperature of the battery unit (B) reaches a predetermined value, such as 46° C., thereby indicating the completion of the fast charging operation.

The battery charging device conducts a slow charging operation when the switch (T.S.) is in an open circuit state. The direct current signal from the rectifier circuit initially flows through the battery unit (B) and through a current limiting resistor (R5). The resistor (R5) has a resistance (typically 100 Ω) which is much greater than that of the resistor (R3) (typically less than 100 Ω), thus permitting the resistor (R5) to reduce the value of the direct current signal when the battery charging device is in the slow charging state.

The above described battery charging device may incorporate indicator units, such as light emitting diodes (not shown), so as to indicate if the battery charging device is operating in the fast charging state or in the slow charging state.

The main disadvantage of the above described conventional battery charging device is as follows: Note that the switch (T.S.) is in an open circuit state only when the temperature of the battery unit (B) is greater than or equal to 46° C. Since the battery unit (B) gradually cools when the slow charging operation is being conducted, the temperature of the battery unit (B) eventually drops below 46° C., thereby causing the switch (T.S.) to close and enable the battery charging device to operate in the fast charging state. The conventional battery charging device is therefore incapable of maintaining the charging operation in the slow charging state when the fast charging operation has been completed.

SUMMARY OF THE INVENTION

Therefore, the objective of the present invention is to provide a battery charging device with fast and slow charging capabilities and which is capable of maintaining the charging operation in the slow charging state when the fast charging operation has been completed.

Accordingly, the preferred embodiment of a battery charging device of the present invention comprises:

a step-down unit which receives an external alternating current line voltage input and which reduces the line voltage input to an appropriate level;

a rectifier unit which receives the reduced line voltage input from the step-down unit and which generates a direct current signal to charge a rechargeable battery unit;

a current limiting means which interconnects serially the rectifier unit and the battery unit; and a control unit which includes a temperature switch and a high resistance heating unit that is connected across the temperature switch, said switch and said heating unit being provided in a single circuit package, said switch being serially connected to the battery unit and being closed when the temperature of the battery unit is below a predetermined limit, said switch being opened to permit the direct current signal to flow through the heating unit when the temperature of the battery unit reaches the predetermined limit, said heating unit reducing the value of the direct current signal and generating heat which is sufficient to maintain the switch in an open circuit state when the direct current signal flows therethrough.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
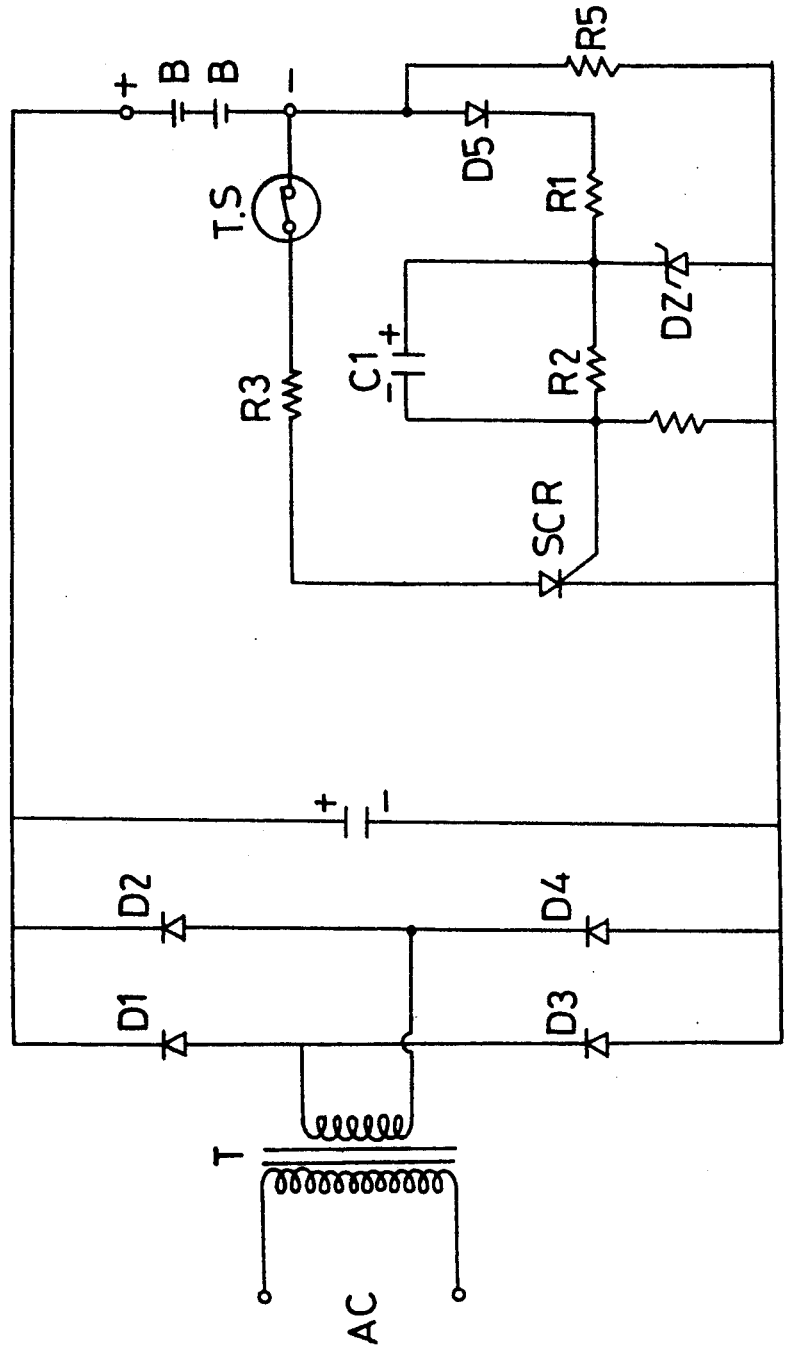
FIG. 1 is a schematic electrical circuit diagram of a conventional battery charging device with fast and slow charging capabilities.
Figure 2:
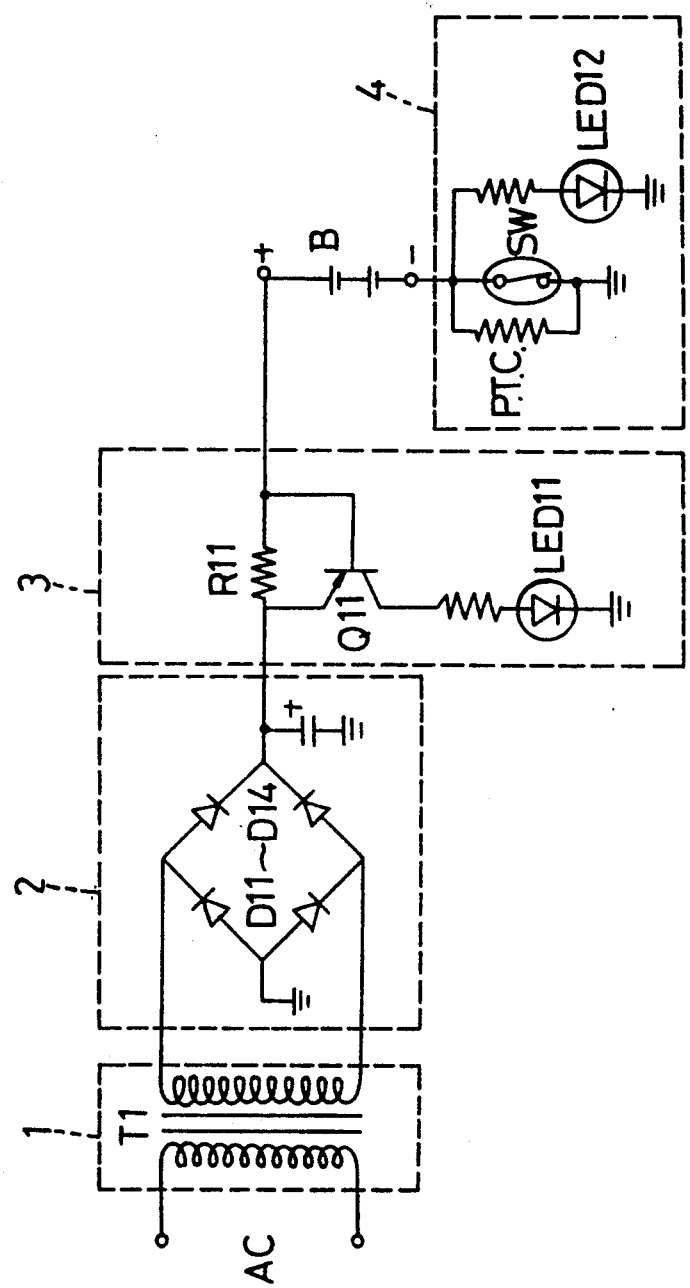
FIG. 2 is a schematic electrical circuit diagram of the preferred embodiment of a battery charging device according to the present invention.

Referring to FIG. 2, the preferred embodiment of a battery charging device according to the present invention is shown to comprise a step-down unit (1), such as a transformer (TI), which receives an external alternating current (AC) line voltage input and which reduces the line voltage input to an appropriate level. The output of the step-down unit (I) is received by a rectifier unit (2). The rectifier unit (2) includes four diodes (D11-D14) which are arranged so as to form a bridge rectifier circuit. The rectifier unit (2) generates a direct current signal which charges a battery unit (B) via a current limiting resistor (R11) of a fast charge indicator unit (3). A control unit (4) is serially connected to the battery unit (B).

The current limiting resistor (R11) has a relatively low resistance and is connected across the emitter and base terminals of a PNP transistor (Q11) of the fast charge indicator unit (3). When the battery charging device is operating in a fast charging state, the direct current signal from the rectifier unit (2) generates a voltage across the resistor (R11), which voltage is sufficient to trigger the transistor (Q11) to conduct. Conduction of the transistor (Q11) permits current to flow through a light emitting diode (LED11) which is serially connected to the collector terminal of the transistor (Q11). The light emitting diode (LED11) generates light at this stage.

The control unit (4) includes a temperature switch (SW) and a high resistance heating unit, such as a positive temperature coefficient thermistor (P.T.C.), which is connected across the temperature switch (SW). The switch (SW) and the thermistor (P.T.C.) are provided in a single circuit package. The switch (SW) is connected in series with the battery unit (B) and is in a closed circuit state when the temperature of the battery unit (B) is below a predetermined limit. No current flows through the thermistor (P.T.C.), thereby preventing the thermistor (P.T.C.) from generating heat at this stage. When the temperature of the battery unit (B) reaches the predetermined limit, the switch (SW) is opened, thereby permitting current to flow through the thermistor (P.T.C.). The thermistor (P.T.C.) generates heat at this stage. Since the switch (SW) and the thermistor (P.T.C.) are provided in a single circuit package, the heat generated by the thermistor (P.T.C.) is sufficient to maintain the switch (SW) in an open circuit state. The control unit (4) further includes a slow charge indicator unit which has a light emitting diode (LED12) that is connected across the switch (SW). Current flows through the light emitting diode (LED12) so as to allow the same to generate light only when the switch (SW) is in an open circuit state.

The following is a more detailed description of the operation of the preferred embodiment:

When the battery charging device is operating in the fast charging state, the direct current signal from the rectifier unit (2) has a relatively large value and flows through the resistor (R11), the battery unit (B) and the switch (SW). The voltage across the resistor (R11) is sufficient to trigger the transistor (Q11) to conduct and cause the light emitting diode (LED11) to generate light. The light emitting diode (LED11) preferably generates red light so as to indicate that the battery charging device is currently operating in the fast charging state. The switch (SW) is connected to one of the terminals of the battery unit (B). Since the temperature of the battery unit (B) gradually increases when fast charging is being conducted, the switch (SW) eventually opens when the temperature of the battery unit (B) reaches a predetermined temperature, such as 46° C, to indicate the termination of fast charging.

When the battery charging device is operating in the slow charging state, the direct current signal from the rectifier unit (2) flows through the resistor (R11), the battery unit (B) and the thermistor (P.T.C.). Current also flows through the light emitting diode (LED12) at this stage so as to allow the same to generate light. The light emitting diode (LED12) preferably generates green light so as to indicate that the battery charging device is currently operating in the slow charging state. The thermistor (P.T.C.) has a relatively large resistance, thereby reducing the value of the direct current signal and causing the thermistor (P.T.C.) to generate heat and maintain the temperature of the switch (SW) above 46° C. so as to keep the switch (SW) in the open circuit state when current flows therethrough. Because the thermistor (P.T.C.) reduces the value of the direct signal, the voltage generated by the direct current signal across the resistor (R11) is insufficient to trigger the transistor (Q11) to conduct. The light emitting diode (LED11) does not generate light at this stage.

It has thus been shown that the switch (SW) of the preferred embodiment is maintained in the open circuit state and is prevented from closing when the preferred embodiment is operating in the slow charging state. Note also that the preferred embodiment has a less complicated construction and requires fewer components, thereby reducing the cost of the battery charging device of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A battery charging device for charging a rechargeable battery unit, comprising:

a step-down unit receiving an external alternating current line voltage input and reducing the line voltage input to an appropriate level;

a rectifier unit receiving the reduced line voltage input from said step-down unit and generating a direct current signal to charge the battery unit;

a current limiting means serially interconnecting said rectifier unit and the battery unit; and a control unit including a temperature switch and a high resistance heating unit connected across said temperature switch, said switch and said heating unit being provided in a single circuit package, said switch being serially connected to the battery unit and being closed when the temperature of the battery unit is below a predetermined limit, said switch being opened to permit said direct current signal to flow through said heating unit when the temperature of the battery unit reaches the predetermined limit, said heating unit reducing the value of said direct current signal and generating heat which is sufficient to maintain said switch in an open circuit state when said direct current signal flows therethrough;

wherein said heating unit is a positive temperature coefficient thermistor;

wherein said current limiting means is a resistor with a relatively low resistance; and said battery charging device further comprises a fast charge indicator means which includes: a PNP transistor having an emitter terminal, a base terminal and a collector terminal, said current limiting means being connected across said emitter and base terminals; and a first light emitting diode means serially connected to said collector terminal;

said direct current signal generating a voltage signal across said current limiting means, said voltage signal being sufficient to cause said transistor to conduct and permit current to flow from said collector terminal to said first light emitting diode means so as to cause said first light emitting diode means to generate light when said switch is closed, said voltage signal being insufficient to cause said transistor to conduct, thereby preventing said first light emitting diode means from generating light when said switch is opened.

2. The battery charging device as claimed in claim 1, further comprising a slow charge indicator means which includes a second light emitting diode means connected across said switch and which generates light only when said switch is opened.

* * * * *